(12) United States Patent
Theis et al.

(10) Patent No.: US 10,295,012 B2
(45) Date of Patent: May 21, 2019

(54) SPINDLE DRIVE

(71) Applicants: Christof Theis, Hillscheid (DE);
Kathrin Kronz, Mittelstrimmig (DE);
Jan Bochen, Eitelborn (DE)

(72) Inventors: Christof Theis, Hillscheid (DE);
Kathrin Kronz, Mittelstrimmig (DE);
Jan Bochen, Eitelborn (DE)

(73) Assignee: Stabilus GmbH, Koblenz (DE)

( * ) Notice: Subject to any disclaimer, the term of this patent is extended or adjusted under 35 U.S.C. 154(b) by 676 days.

(21) Appl. No.: 14/964,811

(22) Filed: Dec. 10, 2015

(65) Prior Publication Data

US 2016/0169317 A1 Jun. 16, 2016

(30) Foreign Application Priority Data

Dec. 11, 2014 (DE) .................. 10 2014 118 379

(51) Int. Cl.
*F16H 25/20* (2006.01)
*F16F 15/08* (2006.01)
*F16H 25/24* (2006.01)

(52) U.S. Cl.
CPC .............. *F16F 15/08* (2013.01); *F16H 25/20* (2013.01); *F16H 25/24* (2013.01); *F16H 2025/2031* (2013.01)

(58) Field of Classification Search
CPC .......... F16F 15/08; F16H 25/20; F16H 25/24; F16H 2025/2031
USPC ................. 74/89.23; 49/324, 334, 340, 349; 403/132, 133
See application file for complete search history.

(56) References Cited

U.S. PATENT DOCUMENTS

| | | | |
|---|---|---|---|
| 3,771,644 A | 11/1973 | Mafli | |
| 3,885,767 A | 5/1975 | Olowinski et al. | |
| 4,934,203 A * | 6/1990 | Bailey | F16H 25/2204 254/103 |
| 5,704,726 A * | 1/1998 | Nemoto | B62D 7/16 403/132 |
| 6,836,040 B2 | 12/2004 | Watanabe et al. | |
| 8,074,732 B2 | 12/2011 | Lehnert et al. | |
| 9,353,836 B2 | 5/2016 | Anheier et al. | |
| 9,360,077 B2 | 6/2016 | Bochen et al. | |

FOREIGN PATENT DOCUMENTS

| | | |
|---|---|---|
| CN | 1387295 | 12/2002 |
| CN | 2606218 | 3/2004 |
| CN | 102015213 | 4/2011 |

(Continued)

*Primary Examiner* — William C Joyce
(74) *Attorney, Agent, or Firm* — Cozen O'Connor

(57) ABSTRACT

A spindle drive for motor-actuated adjustment of an adjusting element includes a tubular spindle drive housing for a drive unit with a downstream spindle-spindle nut gear unit for generating a linear driving motion. A connection part inserted into one end of the drive housing is connected to an exterior socket via a damping arrangement comprising an elastic damping material. The connection part includes first and second flange-like end portions having confrontingly opposed, spaced apart front sides sandwiching the damping arrangement 4 which is connected to the end portion front sides by vulcanization and/or gluing. The socket is carried on the second end portion remote from the damping arrangement 4.

10 Claims, 3 Drawing Sheets

(56) References Cited

FOREIGN PATENT DOCUMENTS

| | | | |
|---|---|---|---|
| CN | 103511574 | | 1/2014 |
| CN | 104136798 | | 11/2014 |
| DE | 2051573 | | 2/1975 |
| DE | 3525815 | | 6/1986 |
| DE | 102011117857 | * | 5/2013 |

* cited by examiner

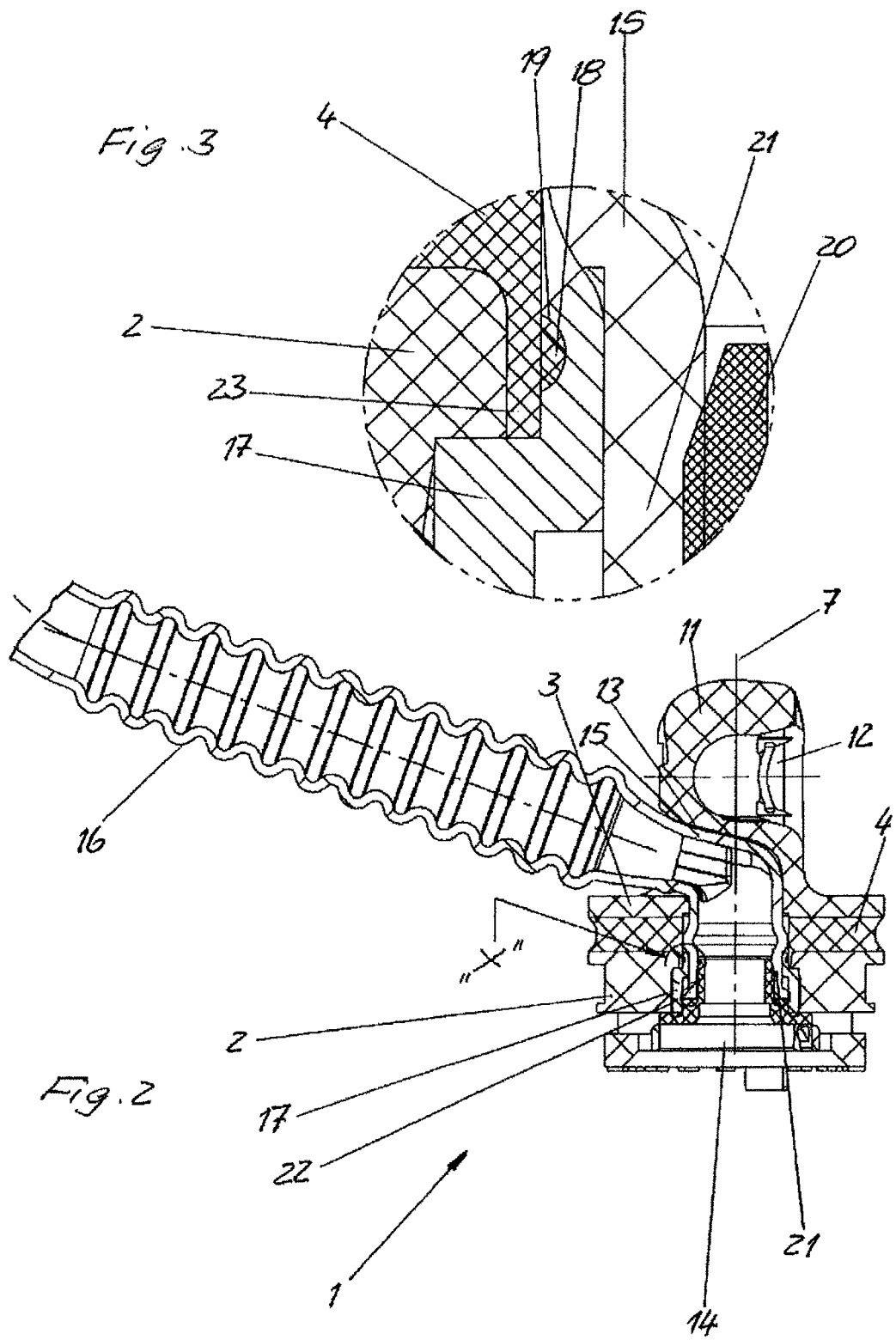

SPINDLE DRIVE

BACKGROUND OF THE INVENTION

1. Field of the Invention

The invention is directed to a spindle drive for motor-actuated adjustment of an adjusting element having a tubular spindle drive housing for a drive unit with a downstream spindle-spindle nut gear unit for generating a linear driving motion, with a connection part inserted into one end of the spindle drive housing and connected outwardly to a socket via a damping arrangement formed of an elastic damping material.

2. Background of the Invention

A particular problem in spindle drives of the type mentioned above arises because vibrations may be generated by the drive unit, which can be an electric motor, and as well by a gear unit which is arranged upstream of the spindle-spindle nut gear unit. These vibrations are transmitted to the adjusting element and correspondingly generate bothersome noises. In an effort to reduce these kinds of noises, it is known to include a damping arrangement formed of a damping can which is filled with damping material and into which a holding portion of the socket projects.

These spindle drives are characterized however by complex and elaborate constructions and are thus costly to manufacture.

SUMMARY OF THE INVENTION

It is accordingly an object of the present invention to provide a spindle drive that is constructed in a simplified manner and is notably easy to manufacture.

In furtherance of this objective and in accordance with the present invention, the connection part of the spindle drive has a first flange-like end portion and a second flange-like end portion with their front sides in spaced apart facing opposition to one another. A damping arrangement is disposed within the space between the first and second end portions, with one end face of the damping arrangement connected to the front side of the first flange-like end portion and the other end face of the damping arrangement connected to the front side of the second flange-like end portion by vulcanization and/or gluing. The second flange-like end portion carries the socket at its side remote from the damping arrangement.

This configuration provides a simplified construction that is easy to assemble and includes only a small number of component parts that are themselves of simple construction and require only a small installation area.

The transmission of force is effected via the damping arrangement and the vulcanized surfaces or glued surfaces of the damping arrangement which is formed only from the elastic damping material.

The improved spindle drive of the present invention allows the damping arrangement to be constructed with a very large extension transverse to the longitudinal axis of the spindle drive so that the total size of the damping arrangement can be kept relatively small and compact.

The damping arrangement of the invention assures that vibrations generated by the drive and gear unit are decoupled from the adjusting element or from the side of the spindle drive opposite the adjusting element and, as a consequence, noise-generating vibrations at the adjusting element or at the side of the spindle drive opposite the adjusting element are at least reduced if not entirely prevented.

The adjusting element can be a hatch, such as a rear hatch of a motor vehicle. When the vibrations are decoupled to the body of the motor vehicle, vibrations can be excited in the body of the motor vehicle without producing noise.

In an embodiment in which the first flange-like end portion, second flange-like end portion and damping arrangement protrude from the spindle drive housing and project radially out past the inner cross-sectional contour of the end of the spindle drive housing, the damping arrangement can be formed with a particularly large extension transverse to the longitudinal axis of the spindle drive, which also allows for a low-profile damping arrangement.

The flange-like end portions and/or the socket can be formed of plastic so that they can be produced in a simple manner by injection molding.

When the inventive spindle drive provides a damping arrangement that is disk-shaped, it can have an advantageously low profile.

By providing the flange-like end portions and the damping arrangement with a coaxial through-hole that leads from the second flange-like end portion via a connection aperture to the outside of the spindle drive, such that the power supply cable and control cable can be guided through the connection aperture and through-hole to the drive unit, provision of an opening in the spindle drive housing for guiding therethrough the power supply cable and control cable can be omitted.

In order to prevent dirt and moisture from entering the spindle drive housing, a sleeve can be inserted into the connection aperture and the through-hole, so that the power supply cable and control cable can be guided through the sleeve.

The sleeve preferably has at its outer end a protective tube that encloses the power supply cable and control cable over their entire length outside of the spindle drive. This protective tube may be implemented as a corrugated tube.

Enhanced protection against the penetration of dirt and moisture can be achieved by sealing the sleeve from the through-hole in the connection part and/or from the first flange-like end portion and/or second flange-like end portion.

To position the end portion of the sleeve, a bushing that encloses the end portion of the sleeve and which is closer to the spindle drive housing can be inserted into the through-hole of the first flange-like end portion, with the bushing being sealed relative to the through-hole of the first flange-like end portion or damping arrangement and relative to the end portion of the sleeve that is closer to the spindle drive housing.

Reduction of the number of component parts to thereby facilitate assembly can be achieved by providing the damping arrangement with a coaxial tubular continuation that projects into the through-hole of the first flange-like end portion, and by forming, integral with the coaxial tubular continuation, a first sealing ring that projects radially inward and which engages in a corresponding radially circumferentially extending annular groove at the outer lateral surface of the bushing.

Fixing of the sleeve in its correct installed position can be provided by a locating bushing inserted into the end portion of the sleeve that is closer to the spindle drive housing, the end portion of the sleeve being clamped by the locating busing against the inner wall of the bushing or against the wall of the through-hole of the first end portion.

The quantity of component parts can further reduced and assembly further facilitated by forming a second sealing ring integral with the outer lateral surface of the end portion of the sleeve that is closer to the spindle drive housing, with the second sealing ring radially outwardly contacting the wall of the through-hole of the first end portion or the inner wall of the bushing.

These and other objects and features of the present invention will become apparent from the following detailed description considered in connection with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements throughout the several embodiments and figures:

FIG. 2 is a sectional view of a second embodiment of a connection part, damping arrangement and socket with inserted sleeve in accordance with the invention;

FIG. 3 is an enlarged view of detail 'X' in FIG. 2; and

DETAILED DESCRIPTION OF THE PRESENTLY PREFERRED EMBODIMENTS

Figure 1:
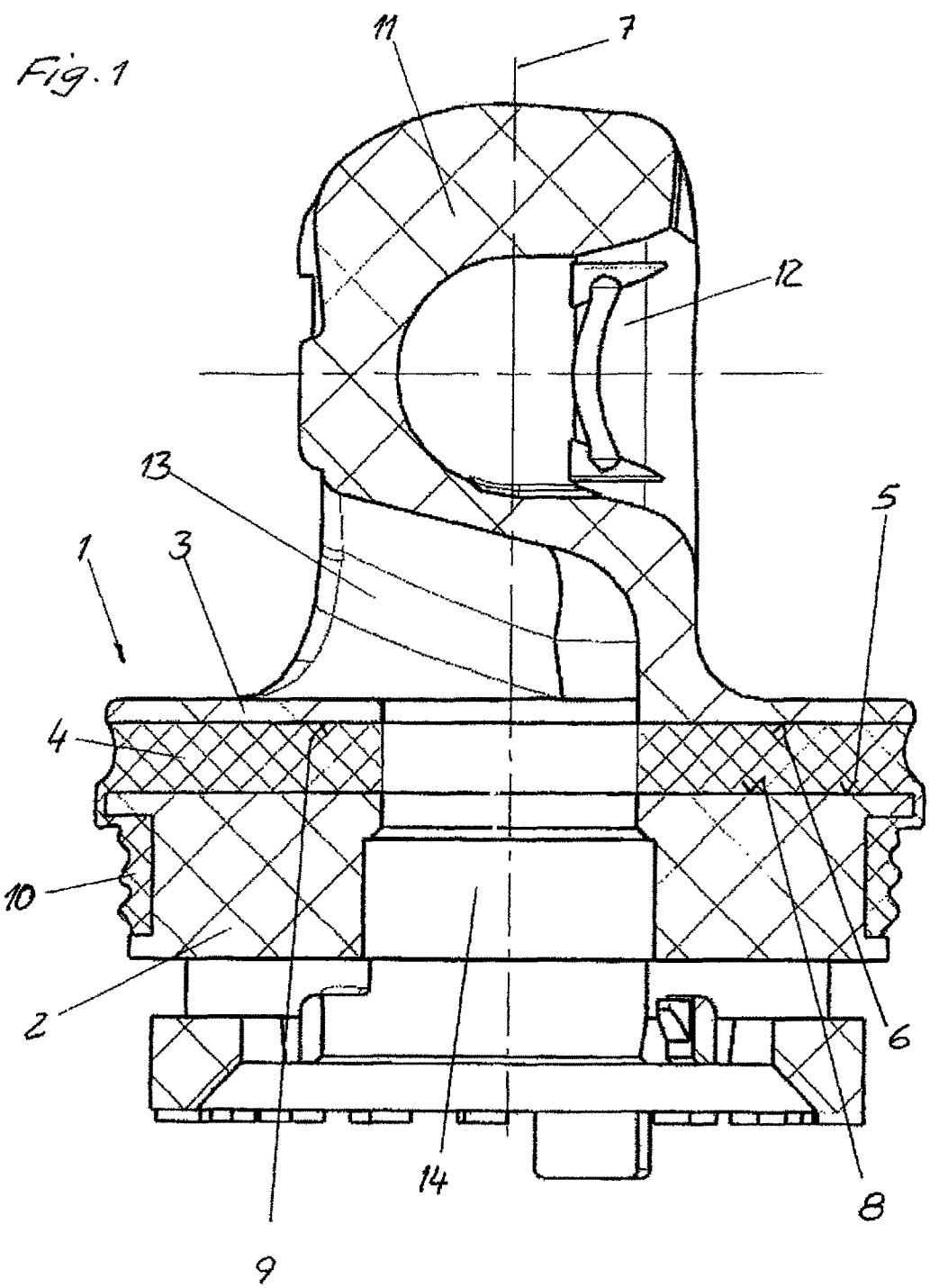
FIG. 1 is a sectional view of a first embodiment of a connection part with damping arrangement and socket of a spindle drive constructed in accordance with the present invention.

Each of the embodiments of the invention shown in the drawings includes a cylindrical connection part 1, 1' that is formed of plastic and that can be inserted by its first flange-like end part or portion 2, 2' into one end of a tubular spindle drive housing (not shown) of a spindle drive for motor-actuated adjustment of an adjusting element.

At its end remote from the spindle drive housing, the connection part 1, 1' has a second flange-like end part or portion 3, 3' that is arranged at an identical distance opposite the first flange-like end portion 2, 2'.

The front side 5 of the first end portion 2 and the opposed front side 6 of the second end portion 3 extend at right angles to the longitudinal axis 7 of the spindle drive in the embodiments depicted in FIGS. 1 to 3.

Figure 4:
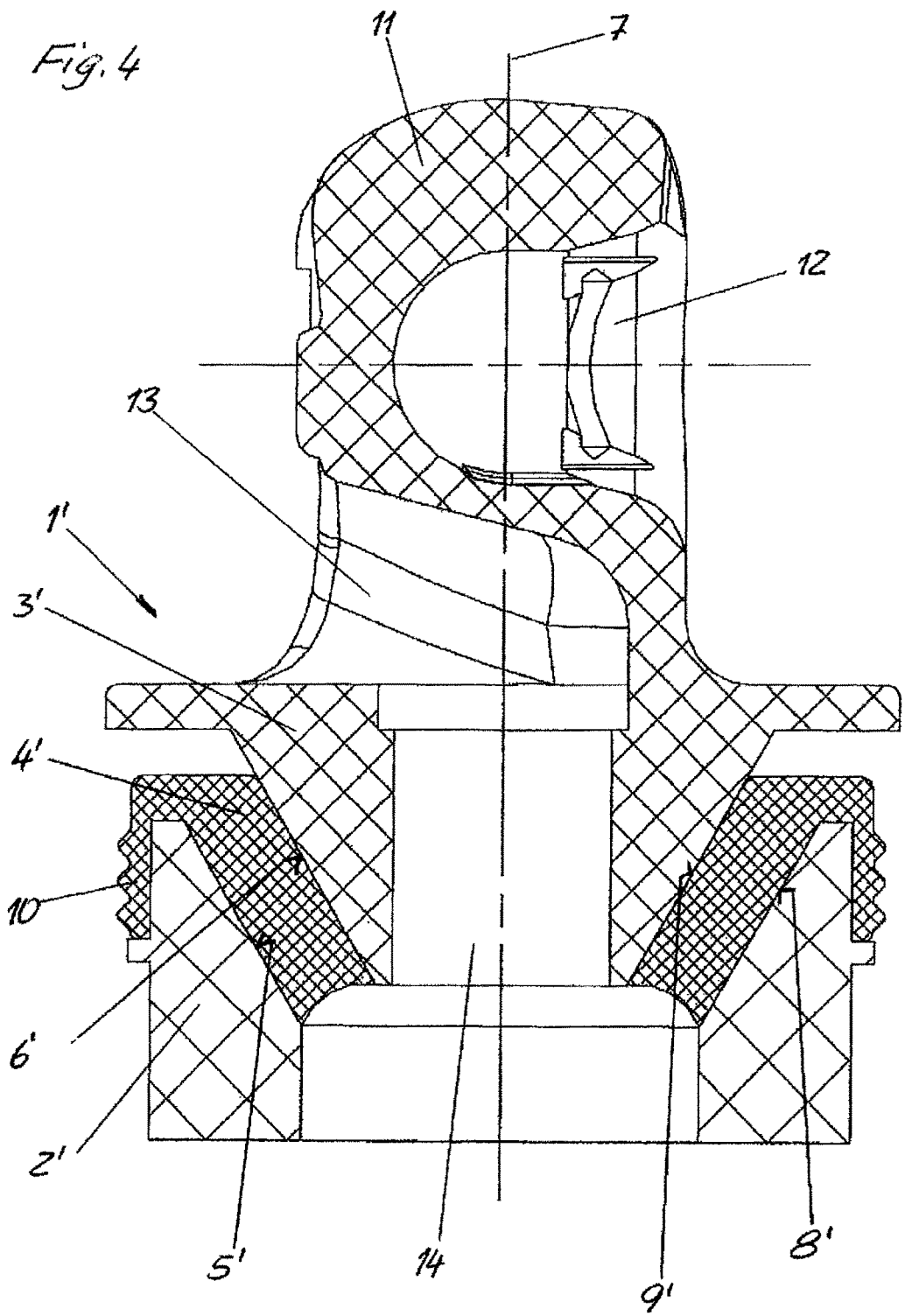
FIG. 4 is a sectional view of a third embodiment of a connection part with damping arrangement and socket in accordance with the invention.

In the embodiment of FIG. 4 (in which elements generally corresponding to those of the embodiments of FIGS. 1 to 3 are denoted by like reference characters with an added prime denominator), on the other hand, the front side 5' of the first end portion 2' and the opposed front side 6' of the second end portion 3' are formed so as to conically narrow coaxially toward the spindle drive housing.

Arranged in the space between the front sides 5, 5' and 6, 6' is a disk-shaped damping arrangement 4, 4' that is formed of an elastic damping material and which is connected, by vulcanization, at one end face 8, 8' to the front side 5, 5' of the first end portion 2, 2' and at its second end face 9, 9' to the front side 6, 6' of the second end portion 3, 3'.

The radially outer circumferential area of the damping arrangement 4, 4' extends around the radially circumferential end region of the first end portion 2, 2' and forms a seal ring 10, 10' for sealing the region of the connection part 1, 1' that is inserted into the spindle drive housing.

At its side remote from the first end portion 2, 2', the second end portion 3, 3' has a socket 11 which is formed as a ball joint connection and that includes an opening 12 directed transverse to the longitudinal axis 7.

A connection aperture 13 opens outward on the side of the socket 11 opposite opening 12 and opens inward into a coaxial through-hole 14 in the flange-like end portions 2, 2' and damping arrangement 4, 4'.

As shown in FIGS. 2 and 3, a sleeve 15 is inserted into the connection aperture 13 and through-hole 14, and continues on the exterior or outer side as a corrugated tube 16. A power supply cable and a control cable (not shown) can be guided into the interior of the spindle drive housing through the corrugated tube 16 and sleeve 15.

A bushing 17 is inserted into through-hole 14 in the first end portion 2 of connection part 1, encloses the end portion of sleeve 15 that is closer to the spindle drive housing and is reduced to a smaller diameter at its end projecting into the through-hole 14 such that an annular gap is formed between the wall of through-hole 14 and the outer lateral surface of bushing 17.

The damping arrangement 4 has a coaxial tubular continuation 23 that projects into the annular gap. A first seal 18 that projects radially circumferentially inward is formed integral with the continuation 23 and engages in a corresponding radially circumferential annular groove 19 at the outer lateral surface of bushing 17.

A locating bushing 20 is inserted into the end portion 21 of sleeve 15 closer to the spindle drive housing. The end portion 21 of sleeve 15 has a radially circumferential second sealing ring 22 formed integral therewith and is clamped by the locating bushing 20 radially outwardly against the inner wall of bushing 17.

While there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. It is the intention, therefore, to be limited only as indicated by the scope of the claims appended hereto.

What is claimed is:

1. In a spindle drive for motor-actuated adjustment of an adjusting element having a tubular spindle drive housing for a drive unit with a downstream spindle-spindle nut gear unit for generating a linear driving motion, a connection part for insertion into one end of the spindle drive housing, the connection part comprising a first flange end portion having a front side and a second flange end portion having a front side, the front sides of the first and second flange end portions being disposed in confronting opposition and spaced apart by a spacing;

a damping arrangement comprising an elastic damping material disposed in said spacing between the first and second flange end portions and having a first end face connected to the front side of the first flange end portion and a second end face opposite the first end face and connected to the front side of the second flange end portion, said connections of the end faces of the elastic damping material to the first and second flange end portions being by one of vulcanization and gluing; and a socket carried on a second side of the second flange end portion remote from the connection of the second flange end portion to the damping arrangement, wherein the first and second flange end portions and the damping arrangement have a coaxial through-hole that leads from the second flange end portion via a connection aperture to outside of the spindle drive, for receiving a power supply cable and a control cable in guided relation through the connection aperture and through-hole to a drive unit of the spindle drive.

2. In a spindle drive in accordance with claim 1, wherein the first flange end portion, the second flange end portion and the damping arrangement protrude from the spindle drive housing and project out radially beyond an inner cross-sectional contour of an end of the spindle drive housing.

3. In a spindle drive in accordance with claim 1, wherein at least one of the first and second flange end portions and the socket is formed of plastic.

4. In a spindle drive in accordance with claim 1, wherein the damping arrangement is disk-shaped.

5. In a spindle drive in accordance with claim 1, further comprising a sleeve inserted into the connection aperture and the through-hole for receiving through the sleeve the power supply cable and the control cable.

6. In a spindle drive in accordance with claim 5, wherein the sleeve is sealed from the through-hole in at least one of the first flange end portion and the second flange end portion.

7. In a spindle drive in accordance with claim 6, further comprising a bushing that encloses an end portion of the sleeve that is closer to the spindle drive housing and that is inserted into the through-hole of the first flange end portion, the bushing being sealed relative to the through-hole of one of the first flange end portion and the damping arrangement and relative to the sleeve end portion.

8. In a spindle drive in accordance with claim 7, wherein the damping arrangement further comprises a coaxial tubular continuation that project into the through-hole of the first flange end portion, and a first sealing ring that projects radially inward and engages in a corresponding radially circumferentially extending annular groove at an outer lateral surface of the bushing, the first sealing ring being formed integral with the coaxial tubular continuation.

9. In a spindle drive in accordance with claim 7, further comprising a locating bushing inserted into the sleeve end portion and the sleeve end portion being clamped against one of an inner wall of the bushing and a wall of the through-hole of the first flange end portion by means of the locating bushing.

10. In a spindle drive in accordance with claim 7, further comprising a second sealing ring formed integral with an outer lateral surface of the sleeve end portion and the second sealing ring radially outwardly contacts a wall of the through-hole in one of the first flange end portion and an inner wall of the bushing.

* * * * *